Figure 1:
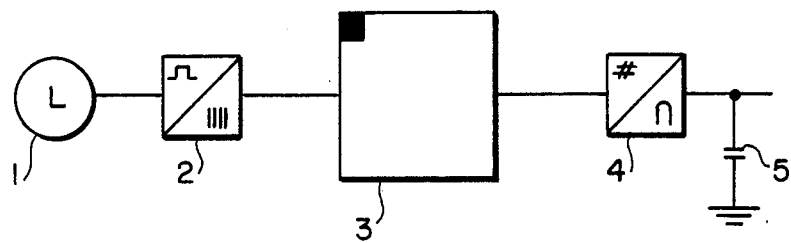
Figure 2:
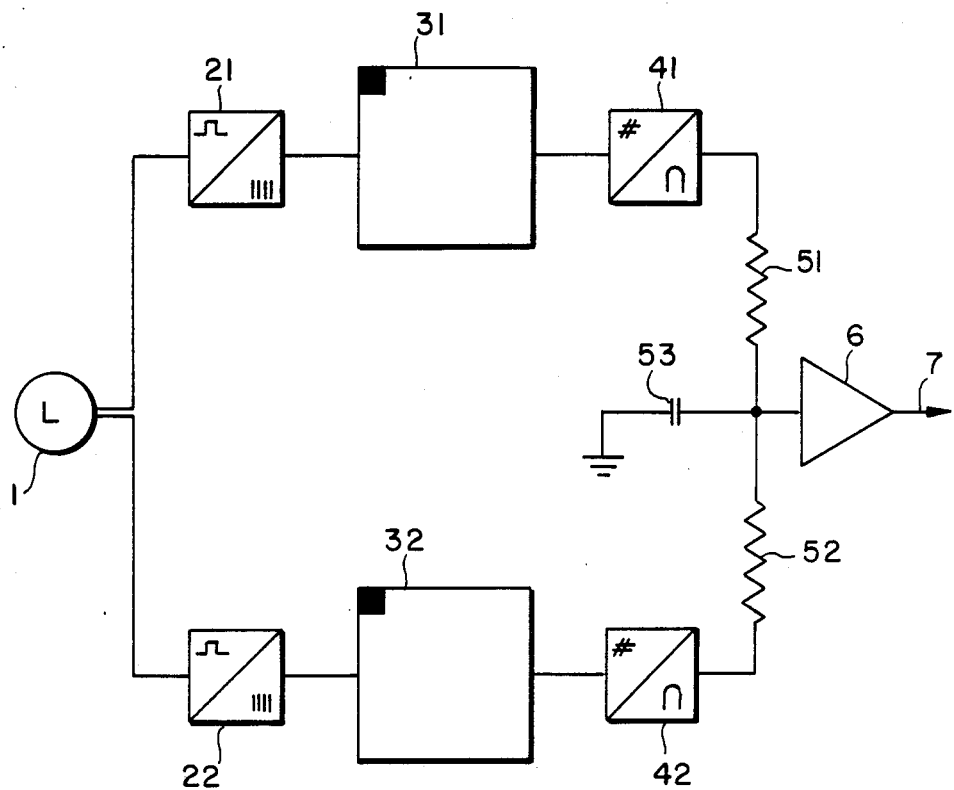

Thus, it will be seen that a multiple channel data transmission system has been provided in which signals from a plurality of pulse operated transducer channels are multiplexed for single channel FM transmission to a receiving station. Auto zeroing of the transducer amplifier in each of the channels is provided to reduce measurement errors.

Although the invention has been illustrated by way of a specific example, it will be understood that various modifications and changes may be made therein without departing from the spirit and scope of the invention as set forth in the following claims.

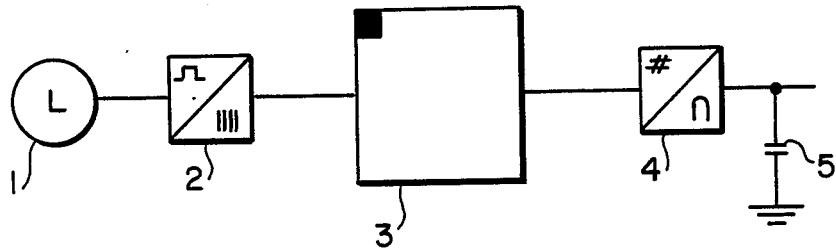

I claim:

1. A multiple channel data transmission system, comprising:
    a plurality of data channels, each channel including a transducer for generating an output signal proportional to a variable to be measured in response to the application of a transducer excitation pulse thereto, a transducer amplifier means for amplifying the output of said transducer in response to the application of an amplifier excitation pulse, a sample-and-hold circuit means for sampling and holding the output level of said amplifier means in response to a sample-and-hold strobe pulse applied thereto and an auto zeroing means for nulling the output of said amplifier means in response to an auto zero strobe pulse applied thereto;
    a control means for cyclically generating at a selected cycle rate said transducer excitation pulse, said amplifier excitation pulse, said sample-and-hold strobe pulse and said auto zero strobe pulse so that said amplifier means is excited for a preselected period during which said auto zero strobe pulse is generated followed by said transducer excitation pulse and said sample-and-hold strobe pulse is generated during said transducer excitation pulse so that the value stored by said sample-and-hold circuit means is updated during each cycle of said control means, thereby producing pseudo-continuous outputs from said sample-and-hold circuit means of each of said plurality of data channels;
    a transmitter means including a multiplexer means for continuously sampling said pseudo-continuous outputs of each of said data channels and multiplexing said signals onto a a single channel to produce a modulated signal to be transmitted; and
    a receiver means for receiving said modulated signal.

2. The system as set forth in claim 1 wherein said transducer amplifier means includes an operational amplifier having an output offset nulling input and wherein said auto zeroing means includes an integrating capacitor means for storing a charge proportional to the zero offset of the output of said operational amplifier when connected to the output of said operational amplifier, a relay means operative in response to said auto zero strobe pulse for connecting said integrating capacitor means to the output of said operational amplifier, and a voltage generating means for generating and applying a nulling voltage level to said offset nulling input of said operational amplifier in response to the charge stored by said integrating capacitor means to continually compensate for zero offset of the output of said operational amplifier.

3. The system as set forth in claim 2 wherein said sample-and-hold circuit means includes an analog switch connected to the output of said operational amplifier and having an activating input connected to receive said sample-and-hold strobe pulse, a charge storage capacitor connected to the output of said switch, and an output circuit means for generating an output signal proportional to the charge stored on said charge storage capacitor.

* * * * *

United States Patent [19]

Marchand

[11] Patent Number: 4,680,586
[45] Date of Patent: Jul. 14, 1987

[54] GENERATOR CAPABLE OF PRODUCING MULTIPLE SIGNALS WITH DIFFERENT FREQUENCIES AND A TRANSMITTER WHICH INCLUDES A SIGNAL GENERATOR OF THIS KIND

[75] Inventor: Patrick Marchand, Fraconville, France

[73] Assignee: Jeumont-Schneider Corporation, Puteaux, France

[21] Appl. No.: 779,672

[22] Filed: Sep. 24, 1985

[30] Foreign Application Priority Data

Sep. 26, 1984 [FR] France .................. 84 14784

[51] Int. Cl.$^4$ ............................. G08C 19/26
[52] U.S. Cl. ................................. 340/870.26
[58] Field of Search ........... 340/870.26, 825.71, 340/825.72, 825.73, 825.76; 364/718

[56] References Cited
PUBLICATIONS

Kinsel, T. S. et al., A Digital Signal Generator, from IEEE Micro., Nov. 1981, pp. 6–15.

Primary Examiner—Jerry W. Myracle
Attorney, Agent, or Firm—Rines and Rines, Shapiro and Shapiro

[57] ABSTRACT

In accordance with the present invention, a signal generator providing multiple signals with different frequencies includes, in a combined form, a clock (1), an address counter (2), a memory (3), and a digital-to-analog converter (4), which are to be series-connected. Individual storage locations within the memory (3) shall be preloaded with amplitude samples for the entire group of signals with different frequencies, which are to be selected in such a manner that storage locations in use within the aforementioned memory (3) shall contain an integral number of cycles for each signal. The address counter (2), which is controlled by the clock (1), shall successively address each storage location within the memory (3), and a capacitor (5) connected to the converter output shall be used to smooth the resulting signal. Applicable for systems permitting prompt transmission of multiple messages within railway systems, by use of contact ramps.

6 Claims, 2 Drawing Figures